Aug. 9, 1966  R. R. BAWABE  3,265,129

HEAT EXCHANGER CONSTRUCTION

Filed June 26, 1964

INVENTOR
RAFAEL R. BAWABE
BY Norman Friedland
ATTORNEY

United States Patent Office 3,265,129
Patented August 9, 1966

3,265,129
HEAT EXCHANGER CONSTRUCTION
Rafael R. Bawabe, Manchester, Conn., assignor to United Aircraft Corporation, East Hartford, Conn., a corporation of Delaware
Filed June 26, 1964, Ser. No. 378,096
3 Claims. (Cl. 165—166)

This invention relates to cores of heat exchangers of the plate-fin type and particularly to the corner design of the closure member forming the structural support for the headers and the like.

As is well known in the heat exchanger art the core of a plate-fin heat exchanger serves as the main structure to which all headers, brackets and accessories are attached. Usually headers are welded to the corner where most of the structural loads are applied. In the heretofore known plate-fin heat exchangers of the cross-flow type the closure channels or bars are brought straight and perpendicular to each other, thus forming a square corner. Core bands are than welded to the corners and the headers, in turn, are welded to the core bands. Where high pressures or structural loads have to be transmitted to the core, the amount of weld area required is large and such a square corner does not allow sufficient weld area. In these heretofore known heat exchangers the weld area is limited by the thickness of the closure channel and often the area welds extend over the channel openings.

In some applications the closure members are bent 90° around the corner to allow additional weld area; however, by doing this, parts of the core adjacent to the bend are blocked and the flow area is reduced which results in a poor performance. An example of such a core construction is disclosed in U.S. application Serial No. 292,892 filed on July 5, 1963 now Patent No. 3,196,942 granted July 27, 1965 by K. R. Prentiss and assigned to the same assignee. This invention constitutes an improvement over the structure shown in the above said patent.

I have found that I can obviate the disadvantages noted above by bending the closure bar or channel less than 90° at the corners and thus when the core is stacked, the mitered bends are aligned such that they form a continuous solid area at the corners. Such corners provide the necessary weld area for attaching the headers, core bands and the like. Such corners can easily accommodate by direct welding the header without the use of core bands.

It is therefore an object of this invention to provide closure members that are bent at their ends at an angle less than 90° so that when they are stacked, the mitered bends are aligned to form a continuous solid area at the corners of the core.

A still further object of this invention is to provide closure bars that are bent at less than 90° for defining a solid corner which construction is characterized as providing: (1) large weld areas; (2) alleviate obstruction to flow passages; (3) permit welding of the header directly to the corner without utilizing core bands; (4) allow the construction of heat exchangers utilized in high pressure applications; (5) permit the welding to take place away from sharp corners and fins; and (6) minimize possible leaks in welded corners.

Other features and advantages will be apparent from the specification and claims and from the accompanying drawings which illustrate an embodiment of the invention.

The matrix or the core of the heat exchanger of the plate-fin type is formed from stacked layers of continuous fin elements. Each layer is mounted so that flow passing therethrough is in cross-flow relationship with alternate layers.

Figure 1:
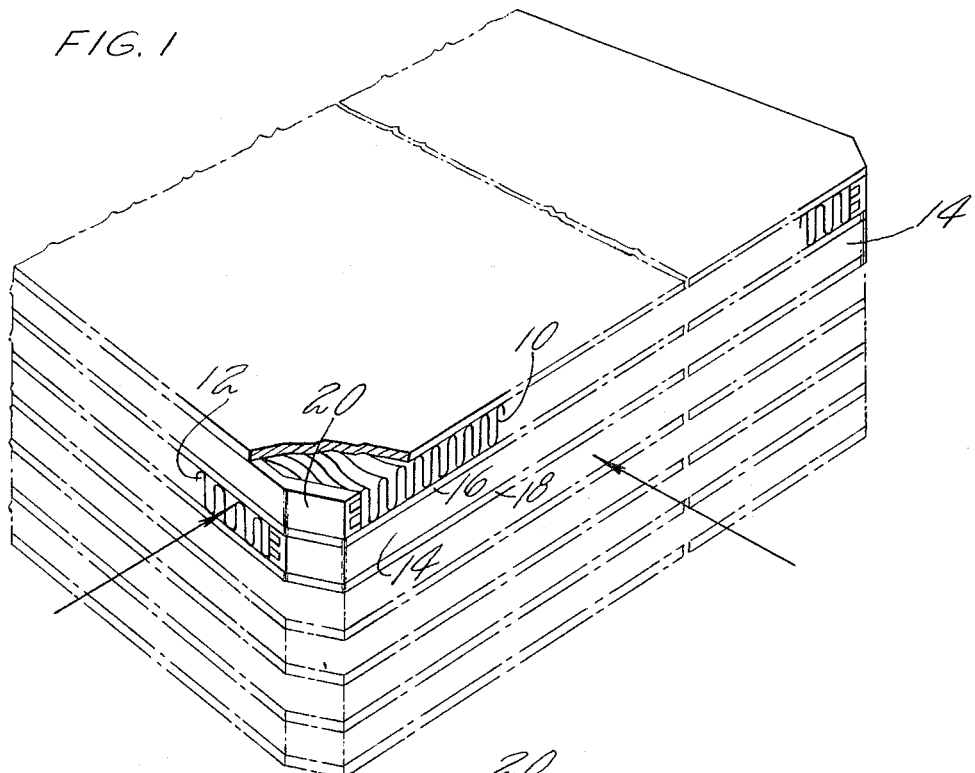
FIG. 1 is a perspective view of a portion of a heat exchanger core showing the mitered corner in aligned relationship for defining a solid area at the corners of the core.

As can be seen in FIG. 1 the fins are identified by numerals 10 and 12. A parting sheet overlies each fin and a pair of parting sheets sandwich each of the continuous fins for defining open ended channels terminating at opposite edges of the fin elements. While only two layers are shown in FIG. 1, it is obvious that a number of these layers are similarly stacked for completing the core. The number of layers, of course, depends on the particular application.

It will be appreciated and apparent from the drawing that the channels in alternate layers are mounted to lie in transverse relation to each other.

Closure bar 14 is mounted adjacent to side of the fin element 12 and abuts the edges of the parting sheets 16 and 18. A second closure bar 20 in the second layer is mounted adjacent the side of the fin element 10 and abuts the spaced plate 16 and the plate in the next layer (not shown).

In accordance with this invention the closure bars at the corner of the core are bent at an angle of less than 90°, say 45°, and the edge of the parting sheets are cut so that their corners are in alignment such that they form a continuous solid area at the corners of the core.

Obviously, stacking the closure bars in this manner forms a continuous rigid surface having extended area for receiving headers, core bands and the like. By bending the ends of the closure bar at an angle of less than 90° it will be appreciated that the fluid flowing in the channels at the inlet and outlet is not blocked off, but the direction is slightly altered to flow around the closure bar. I have found that a 45° bend does not incur any appreciable pressure drop or impair the performance by the heat exchanger.

Figure 2:
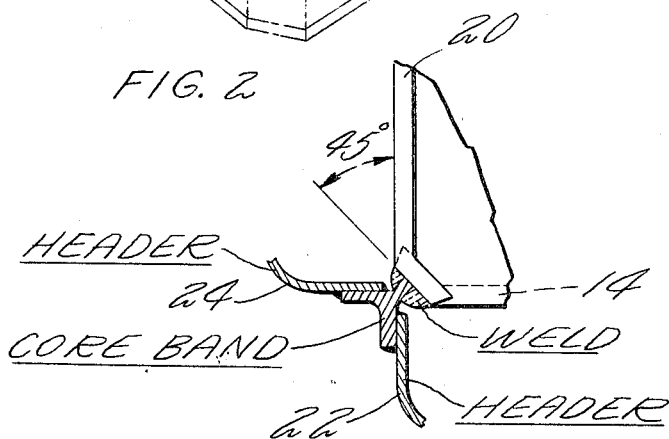
FIG. 2 is an illustration showing a section of the core where a core band is welded to the corner.

While the headers may be welded directly on the area formed by the mitered corners as shown in FIG. 2, the core bar extending from the top to the bottom of the core may be suitably welded to the bent corner. The core band is then adapted to support suitable headers partially illustrated by numerals 22 and 24. Obviously, similar core bands are formed at the other corner of the core to support the other edge of the headers.

It should be understood that the invention is not limited to the particular embodiments shown and described herein, but that various changes and modifications may be made without departing from the spirit or scope of this novel concept as defined by the following claims.

I claim:

1. A multi-channel multi-pass plate and fin heat exchanger having a core of stacked layers, each layer including a continuous fin element, spaced plates sandwiching the sides of said fin element defining therewith a series of separate parallel open ended channels terminating at an edge of the fin element, said layers being stacked so that the channels formed in one layer lie in a direction transverse to the channels in the adjacent layer, elongated closure bars extending the length of said layers abutting the spaced plates adjacent the side of said fin elements, the ends of said closure members being bent inwardly toward said fin element and the angle of said bend being less than 90°, said ends of alternate closure members being complementary for defining a continuous rigid corner surface, headers secured to said surface defining an inlet and outlet for communicating with the channels at the ends of the fin elements.

2. A multi-channel multi-pass plate and fin heat exchanger as claimed in claim 1 wherein said ends of said closure members are bent at a 45° angle.

3. A multi-channel multi-pass plate and fin heat exchanger having a core of stacked layers, each layer including a continuous fin element, spaced plates sandwiching the sides of said fin element defining therewith a series of separate parallel open ended channels terminating at the edge of the fin element, said layers being stacked so that the channels formed in one layer lie in a direction transverse to the channels in the adjacent layer, elongated open-ended closure bars extending the length of said layers abutting the spaced plates adjacent the side of said fin elements, the ends of said closure members being bent inwardly toward said fin element, the angle of said bend being less than 90°, said ends of alternate closure members being complementary for defining a continuous rigid corner surface, elongated core bands extending transverse to said fins secured to said surface, headers secured to said core bands defining an inlet or outlet for communicating with the channels at opposite ends of the fin elements.

References Cited by the Examiner
UNITED STATES PATENTS

| 2,618,357 | 11/1952 | Harlow | 165—166 X |
| 2,959,400 | 11/1960 | Simpelaar | 165—166 |
| 2,961,222 | 11/1960 | Butt | 165—166 |

OTHER REFERENCES

German printed application, 1,075,135, 11/1960.

ROBERT A. O'LEARY, *Primary Examiner.*

T. W. STREULE, *Assistant Examiner.*